US012757165B2

(12) United States Patent
Hu et al.

(10) Patent No.: US 12,757,165 B2
(45) Date of Patent: Oct. 6, 2026

(54) METHOD FOR WIRELESS COMMUNICATION, TERMINAL DEVICE, NETWORK DEVICE AND CHIP

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 275 days.

(21) Appl. No.: 18/754,633

(22) Filed: Jun. 26, 2024

(65) Prior Publication Data

US 2024/0349245 A1 Oct. 17, 2024

Related U.S. Application Data

(63) Continuation of application No. PCT/CN2022/070842, filed on Jan. 7, 2022.

(51) Int. Cl.
*H04W 68/02* (2009.01)
*H04W 8/22* (2009.01)
*H04W 52/02* (2009.01)

(52) U.S. Cl.
CPC ............ *H04W 68/02* (2013.01); *H04W 8/22* (2013.01); *H04W 52/0235* (2013.01)

(58) Field of Classification Search
CPC .... H04W 68/02; H04W 8/22; H04W 52/0235
See application file for complete search history.

(56) References Cited

U.S. PATENT DOCUMENTS

| | | | | |
|---|---|---|---|---|
| 2022/0232514 | A1* | 7/2022 | Tseng | H04W 52/0209 |
| 2024/0323917 | A1* | 9/2024 | Li | H04W 36/08 |
| 2024/0381316 | A1* | 11/2024 | Shi | H04B 7/06952 |

FOREIGN PATENT DOCUMENTS

| | | |
|---|---|---|
| CN | 113056951 | 6/2021 |
| CN | 113163476 | 7/2021 |
| CN | 113170282 | 7/2021 |
| WO | 2021180206 | 9/2021 |

OTHER PUBLICATIONS

WIPO, International Search Report for PCT/CN2022/070842, Aug. 29, 2022.
Qualcomm Inc, "Power saving enhancements for paging reception," 3GPP TSG-RAN WG2 Meeting #113-e, R2-2100313, Jan. 2021.
ETSI MCC, "Report of 3GPP TSG RAN WG2 meeting #116-e, Online," 3GPP TSG-RAN WG2 meeting #116bis-e, R2-22xxxxx, Nov. 2021.
Mediatek Inc., "New WID: UE Power Saving Enhancements," 3GPP TSG RAN Meeting #86, RP-193239 (revision of RP-193173), Dec. 2019.

* cited by examiner

*Primary Examiner* — Justin Y Lee
(74) *Attorney, Agent, or Firm* — Hodgson Russ LLP

(57) ABSTRACT

Provided is a method for wireless communication. The method includes: monitoring, by a terminal device, a first paging early indication (PEI) transmitted by a network device, wherein the first PEI comprises first wake-up indication information, the first wake-up indication information comprising first indication information, the first indication information comprising M bits and being a wake-up indication for a first paging occasion (PO) corresponding to the first wake-up indication information, the first PO being a PO associated with the first PEI, and M being greater than or equal to 1.

11 Claims, 5 Drawing Sheets

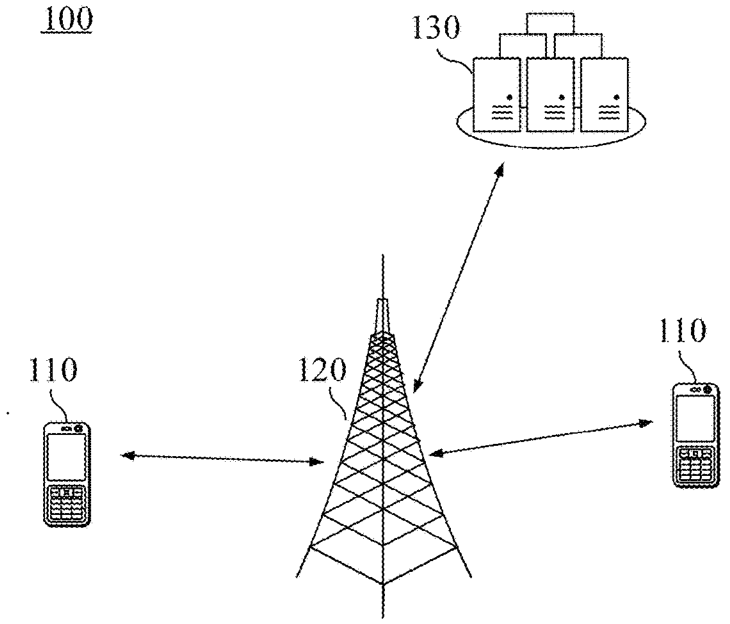

FIG. 1

Monitoring, by a terminal device, a first PEI transmitted by a network device. The first PEI includes first wake-up indication information. The first wake-up indication information includes first indication information. The first indication information is a wake-up indication for a first PO corresponding to the first wake-up indication information. The first PO is a PO associated with the first PEI

S201

FIG. 2

Transmitting, by a network device, a first PEI. The first PEI includes first wake-up indication information. The first wake-up indication information Includes first indication information. The first indication information is a wake-up indication for a first PO corresponding to the first wake-up indication information. The first PO is a PO associated with the first PEI

S301

FIG. 3

METHOD FOR WIRELESS COMMUNICATION, TERMINAL DEVICE, NETWORK DEVICE AND CHIP

CROSS-REFERENCE TO RELATED APPLICATION

This application is a continuation of International Application No. PCT/CN2022/070842, filed Jan. 7, 2022, the entire disclosure of which is incorporated herein by reference.

TECHNICAL FIELD

Embodiments of the present disclosure relate to the technical field of mobile communications, and in particular, relate to a method for wireless communication, a terminal device, a network device, and a chip.

BACKGROUND

With respect to paging based on grouping of user equipments (UEs), a group identifier (group ID) of a UE may be determined by a core network (CN); and in the case that the CN does not assign a group ID to the UE, the group ID may be determined based on a UE ID.

SUMMARY

Embodiments of the present disclosure provide a method for wireless communication, a terminal device, a network device, and a chip.

Some embodiments of the present disclosure provide a method for wireless communication. The method includes:

monitoring, by a terminal device, a first paging early indication (PEI) transmitted by a network device, wherein the first PEI includes first wake-up indication information, the first wake-up indication information including first indication information, the first indication information being a wake-up indication for a first paging occasion (PO) corresponding to the first wake-up indication information, the first PO being a PO associated with the first PEI.

Some embodiments of the present disclosure provide a method for wireless communication. The method includes:

reporting, by a terminal device, first capability information to a network device, wherein the first capability information indicates whether the terminal device has a first capability, the first capability being a capability of the terminal device in the case that a PEI capability and a group paging capability are bound.

Some embodiments of the present disclosure provide a method for wireless communication. The method includes:

transmitting, by a network device, a first PEI, wherein the first PEI includes first wake-up indication information, the first wake-up indication information including first indication information, the first indication information being a wake-up indication for a first PO corresponding to the first wake-up indication information, the first PO being a PO associated with the first PEI.

Some embodiments of the present disclosure provide a method for wireless communication. The method includes:

receiving, by a network device, first capability information reported by a terminal device, wherein the first capability information indicates whether the terminal device has a first capability, the first capability being a capability of the terminal device in the case that a PEI capability and a group paging capability are bound.

Some embodiments of the present disclosure provide a communication device. The communication device is the terminal device in the above solutions or the network device in the above solutions, and the communication device includes a processor and a memory. The memory is configured to store one or more computer programs, and the processor, when loading and running the one or more computer programs stored in the memory, is caused to perform the method for wireless communication as described above.

Some embodiments of the present disclosure provide a chip. The chip is configured to perform the method for wireless communication as described above.

The chip includes: a processor, wherein the processor, when loading and running one or more computer programs in a memory, causes a device equipped with the chip to perform the method for wireless communication as described above.

BRIEF DESCRIPTION OF THE DRAWINGS

The accompanying drawings described herein, which are provided for a further understanding of the present disclosure, constitute a part of the specification. The embodiments of the present disclosure and the description thereof are provided to illustrate the present disclosure and do not constitute undue limitations on the present disclosure. In the accompanying drawings:

FIG. 1 is a schematic diagram of an application scenario according to some embodiments of the present disclosure;

FIG. 2 is an alternative flowchart of a method for wireless communication according to some embodiments of the present disclosure;

FIG. 3 is an alternative flowchart of a method for wireless communication according to some embodiments of the present disclosure;

DETAILED DESCRIPTION

Figure 4:
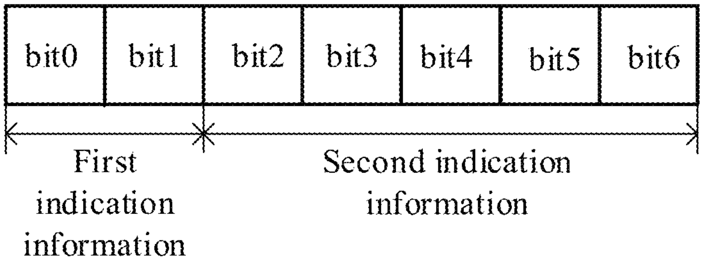
FIG. 4 is a schematic diagram of an alternative format of first wake-up indication information according to some embodiments of the present disclosure.

The technical solutions in the embodiments of the present disclosure will be described hereinafter with reference to the accompanying drawings in the embodiments of the present disclosure, and it is apparent that the described embodiments are only a part, but not all of the embodiments of the present disclosure. All other embodiments acquired by those of ordinary skills in the art without creative efforts with respect to the embodiments in the present disclosure shall fall within protection scope of the present disclosure.

FIG. 1 is a schematic diagram of an application scenario according to some embodiments of the present disclosure.

As shown in FIG. 1, the communication system 100 includes terminal devices 110 and a network device 120. The network device 120 communicates with the terminal devices 110 via an air interface. Multi-service transport is supported between the terminal devices 110 and the network device 120.

It is understandable that the embodiments of the present disclosure are only exemplified by the communication system 100, but the embodiments of the present disclosure are not limited thereto. That is, the technical solutions of the embodiments of the present disclosure are applicable to various communication systems, for example: a long-term evolution (LTE) system, an LTE time division duplex (TDD), a universal mobile telecommunications system (UMTS), an Internet of Things (IoT) system, a narrow band internet of things (NB-IoT) system, an enhanced machine-type communications (eMTC) system, a 5G communication system (also called new radio (NR) communication system), or a future communication system.

In the communication system 100 shown in FIG. 1, the network device 120 is an access network device that communicates with the terminal devices 110. The access network device provides communication coverage for a particular geographic region and communicates with terminal devices 110 (e.g., UEs) within the coverage region.

The network device 120 is an evolutional Node B (eNB or eNodeB) in an LTE system, or a next generation radio access network (NG RAN) device, or a base station (gNB) in an NR system, or a wireless controller in a cloud radio access network (CRAN), or the network device 120 is a relay station, an access point, a vehicle-mounted device, a wearable device, a hub, a switch, a bridge, a router, or a network device in a public land mobile network (PLMN) evolved in the future, or the like.

The terminal device 110 is any terminal device including, but not limited to, a terminal device in wired or wireless connection with the network device 120 or other terminal devices.

For example, the terminal device 110 refers to an access terminal, a UE, a subscriber unit, a subscriber station, a rover station, a mobile station, a remote station, a remote terminal, a mobile device, a user terminal, a terminal, a wireless communication device, a user agent, or a user device. The access terminal is a cellular phone, a cordless phone, a Session Initiation Protocol (SIP) phone, an IoT device, a satellite handheld terminal, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, or a terminal device in a future evolution network, or the like.

The wireless communication system 100 further includes a core network device 130 in communication with a base station, wherein the core network device 130 is a 5G core (5 GC) device, such as an access and mobility management function (AMF), an authentication server function (AUSF), a user plane function (UPF), or a session management function (SMF). In some embodiments, the core network device 130 is an evolved packet core (EPC) device, such as a session management function+core packet gateway (SMF+PGW-C) device, of the LTE network. It is understandable that SMF+PGW-C performs the functions that SMF and PGW-C perform simultaneously. In the network evolution process, the core network device is also referred to as other names, or a new network entity is formed by splitting the functions of the core network, which are not limited in the embodiments of the present disclosure.

In some embodiments, the functional units in the communication system 100 communicate with each other by establishing connections via a next generation (NG) network interface.

For example, the terminal device establishes an air interface connection with the access network device via a Uu interface, wherein the air interface is configured to transmit user plane data and control plane signaling; the terminal device establishes a control plane signaling connection with the AMF via an NG interface 1 (N1 for short); the access network device, such as a next generation radio access base station (gNB), establishes a user plane data connection with the UPF via an NG interface 3 (N3 for short); the access network device establishes a control plane signaling connection with the AMF via an NG interface 2 (N2 for short); the UPF establishes a control plane signaling connection with the SMF via an NG interface 4 (N4 for short); the UPF exchanges user plane data with the data network via an NG interface 6 (N6 for short); the AMF establishes a control plane signaling connection with the SMF via an NG interface 11 (N11 for short); and the SMF establishes a control plane signaling connection with the PCF via an NG interface 7 (N7 for short).

FIG. 1 shows one base station, one core network device, and two terminal devices. In some embodiments, the system 100 for wireless communication includes a plurality of base station devices, and other number of terminal devices are included within the coverage region of each of the base stations, which are not limited in the embodiments of the present disclosure.

It should be noted that FIG. 1 illustrates, by way of example only, a system to which the present disclosure is applicable, and the method shown in the embodiments of the present disclosure is also applicable to other systems. Moreover, terms "system" and "network" herein are often used interchangeably. Term "and/or" herein is merely a way to describe the association relationship between associated objects, indicating that there are three possible relationships. For example, "A and/or B" means that: A is present alone, A and B are present simultaneously, and B is present alone. In addition, the character "/" herein generally indicates an "or" relationship between the associated objects. It is understandable that the "indication" mentioned in the embodiments of the present disclosure is a direct indication, an indirect indication, or an indication that there is an association relationship. For example, A indicates B, which may mean that A indicates B directly, e.g., B is acquired by A; or that A indicates B indirectly, e.g., A indicates C, wherein B is acquired by C; or that an association relationship is present between A and B. It is understandable that the "corresponding" mentioned in the embodiments of the present disclosure may indicate a direct corresponding relationship or an indirect corresponding relationship between two items, or indicate an associated relationship between two items. It may also indicate relationships such as indicating and being indicated, configuring and being configured, or the like. It is understandable that, the "predefined" or "predefined rule" mentioned in the embodiments of the present disclosure may be implemented by pre-storing a corresponding code, a table, or another manner that may indicate related information in a device (including, for example, a terminal device or a network device), and the present disclosure does not limit the specific implementation thereof. For example, "predefined" refers to "defined" in a protocol. It is understandable that, in the embodiments of the present disclosure, the "protocol" may refer to a standard protocol in the communication field. For example, the protocol includes an LTE protocol, an NR protocol, or a related protocol applied in future communication systems, which is not limited in the present disclosure.

For facilitating understanding of the technical solutions in the embodiments of the present disclosure, the following explanation is provided for related technologies of the embodiments of the present disclosure. The following related technologies are considered as optional solutions and can be combined in any way with the technical solutions in the embodiments of the present disclosure, all falling within the protection scope of the embodiments of the present disclosure.

With the pursuit of speed, delay, high-speed mobility, and energy efficiency, and the diversity and complexity of services in future life, the 3rd Generation Partnership Project (3GPP) International Standards Organization has begun to develop a 5th generation (5G) mobile communication technology. The main application scenarios of 5G include: enhanced mobile broadband (cMBB), ultra-reliable & low-latency communication (URLLC), and massive machine type of communication (mMTC).

For reducing radio signaling, quickly recovering wireless connection, and quickly recovering data services in a 5G network environment, a new radio resource control (RRC) state, i.e., the RRC_INACTIVE state, is defined. The RRC_INACTIVE state is distinguished from the RRC_IDLE state and the RRC_ACTIVE state.

In the RRC_IDLE state, the mobility means UE-based cell selection and reselection, paging is initiated by the CN, and a paging region is configured by the CN. The base station side does not have a UE access stratum (AS) context or RRC connection.

In the RRC_CONNECTED state, the RRC connection is present, and the base station and the UE have a UE AS context. The network side knows that the location of the UE is of a specific cell level, the mobility is the mobility controlled by the network side, and unicast data is transmitted between the UE and the base station.

In the RRC_INACTIVE state, the mobility is UE-based cell selection and reselection, a connection is present between CN-NR, a UE AS context is present on a certain base station, paging is triggered by a radio access network (RAN), an RAN-based paging region is managed by the RAN, and the network side knows that the location of the UE is of an RAN-based paging region level.

Paging Mechanism of the NR

The main function of paging is to enable the network to page the UE through a paging message in the RRC IDLE or RRC INACTIVE state of the UE, or to notify the UE of system message changes or public warning information such as earthquake and tsunami (applicable to all RRC states, including connected state, of the UE) over a short message.

Paging channels include the physical downlink control channel (PDCCH) scrambled by the paging radio network temporary identifier (P-RNTI), and the physical downlink share channel (PDSCH) scheduled by the PDCCH. The paging message is transmitted in the PDSCH, and the short message (8-bit) is transmitted in the PDCCH.

With respect to a UE in an RRC_IDLE state or an RRC_INACTIVE state, as other data communications are not present between the UE and a network, for saving power of the terminal, the UE monitors a paging channel discontinuously, that is, a paging discontinuous reception (DRX) mechanism is adopted. Under the Paging DRX mechanism, the UE only needs to monitor paging during one paging occasion (PO) of each DRX cycle.

TS 38.304 specifies that the PO is composed of a plurality of PDCCH monitoring occasions in a paging search space, that is, the PO contains X PDCCH monitoring occasions, wherein X is equal to the number of synchronization signal blocks (SSBs) actually transmitted in the master information block (MIB), wherein the SSB is composed of three parts, the three parts including the primary synchronization signals (PSSs), the secondary synchronization signals (SSSs), and the physical broadcast channels (PBCHs). Moreover, for the concept of the paging frame (PF), the PF refers to a radio frame (fixed at 10 ms) that contains one or more POs or a starting location of one or more POs.

The paging DRX cycle is determined jointly by a common cycle in system broadcast and a dedicated cycle configured in high-level signaling (NAS signaling), and the UE takes the minimum cycle in the common cycle and the dedicated cycle as the paging DRX cycle. From the perspective of the network, one paging DRX cycle may contain a plurality of POs. The location at which the UE monitors the POs is related to an ID of the UE, and the PF and PO of a certain UE in one paging DRX cycle are determined as follows (TS 38.304):

the SFN number of the PF is determined by formula (1):

$$(SFN+\text{PF\_offset}) \bmod T=(T\ div\ N)*(\text{UE\_ID} \bmod N); \quad \text{formula (1)}$$

the index (i_s) for the location of a PO within one PF is determined by the following formula:

$$\text{i\_s}=\text{floor}(\text{UE\_ID}/N) \bmod Ns. \quad \text{formula (2)}$$

In the formulas, T represents a DRX cycle for UE receiving paging. The network broadcasts one default DRX cycle, and in the case that the RRC/high level configures a UE-specific DRX cycle for the UE, the minimum DRX cycle of the DRX cycle broadcasted by the network and the UE-specific DRX cycle configured by the RRC/high level is taken as the DRX cycle of the UE. In the case that the RRC/high level does not configure a UE-specific DRX cycle for the UE, the DRX cycle broadcasted by the network is taken as the DRX cycle of the UE. N represents the number of PFs contained in one T; Ns represents the number of POs contained in one PF;

PF_offset represents a time-domain offset configured to determine the PF;

UE_ID represents a remainder acquired by dividing 5G serving-temporary mobile subscriber identity (S-TMSI) by 1024.

Upon acquiring the index of the PF and the PO and the number of PDCCH monitoring occasions in the PO through calculation according to the above formulas, the UE determines the starting location of the first PDCCH monitoring occasion of the PO only by using the relevant configuration parameters, wherein the starting location is configured through high-level signaling. The UE blindly detects the paging message based on the determined PO.

Paging False Alarm

The paging false alarm represents a false alarm of paging. As can be seen from the determination of the PO by the UE, the determination of the PO is related to UE ID and the total number of PFs and POs. With a large number of UEs, in the case that a network device cannot allocate each of the UEs to a different PO, a plurality of UEs may correspond to one PO. In the case that the network needs to page a specific UE on the PO, paging for the specific UE may cause the UEs that do not have a paging message to perform blind detection, wherein the blind detection includes blind detection of a PDCCH and a corresponding PDSCH. For the UEs that do not have the paging message, this false paging is a paging false alarm.

In the work project of R17, a further enhancement project about power saving for terminals is agreed. One object of this project is to reduce unnecessary UE paging reception by designing an enhanced paging mechanism, thereby reducing paging false alarms.

Based on the current standardization progress of the R17 UE power saving project, the following mechanisms are provided to reduce paging false alarms.

1. The PEI designed based on the PDCCH is introduced, that is, the network transmits the PEI before a PO, and the UE determines whether to normally monitor paging on the corresponding PO or skip paging monitoring based on the received PEI.

2. A paging mechanism based on grouping of UEs is introduced, that is, a plurality of UEs allocated to a same PO are further grouped, the network can indicate which UE group or UE groups the paging message is intended for, and then UEs in other UE groups do not need to receive the paging message. Paging group indication information indicating which UE group or UE groups the paging message is intended for is carried in PEI.

3. With respect to paging based on the UE group, a group identifier (group ID) of the UE is determined by the CN, and in the case that the CN does not assign the group ID to the UE, the group ID is determined based on the UE ID.

4. For supporting the group mode based on the UE ID, a base station needs to broadcast the number of paging groups based on the UE ID that supported by a cell.

5. For supporting the paging group mode based on CN assignment, it is assumed that all cells in a registration region have the same number of paging groups based on the CN assignment, no conclusion has been yet reached on how to determine the number of paging groups based on the CN assignment.

One cell simultaneously supports the paging group modes based on the UE ID and the CN assignment, and the corresponding group IDs in the paging group modes based on the UE ID and the CN assignment are not overlapped. One piece of paging group indication information in the PEI corresponds to one paging group based on the UE ID or one paging group based on the CN assignment.

Moreover, with respect to the group paging, one PO supports a maximum of 8 groups.

The PEI indicates group paging, that is, each bit in the PEI indicates a UE wake-up of one group (group ID based on the CN assignment or group ID based on the UE ID). Thus, in the case that a PO has N groups, N bits are defined in the PEI for the wake-up indication of N groups in one PO.

With respect to the group paging, from a UE perspective, the group mode based on the UE ID and the group mode based on the CN assignment are two independent UE capabilities, that is, the UE may not support the group-based paging, or only support the group mode based on the UE ID, or only support the group mode based on the CN assignment, or have both the group mode based on the UE ID and the group mode based on the CN assignment. From the perspective of the base station, the base station may not support the group-based paging, or only support one of the group mode based on the UE ID and the group mode based on the CN assignment, or have both the group mode based on the UE ID and the group mode based on the CN assignment. Thus, in some cases, the UE may not have an available group ID in a cell where it resides. For example, the UE only supports one of the group mode based on the UE ID and the group mode based on the CN assignment, while the base station only supports the other one of the group modes based on the UE ID and the group mode based on the CN assignment. In this case, the wake-up indication for N groups of one PO in the PEI is applicable to the UE. For this case, how the UE monitors paging based on the monitored PEI is a problem to be solved.

For facilitating understanding of the technical solutions of the embodiments of the present disclosure, the technical solutions are described in detail hereinafter with specific embodiments. As an alternative, the above related arts may be combined with the technical solutions of the embodiments of the present disclosure in any manner, all of which fall within the protection scope of the embodiments of the present disclosure. The embodiments of the present disclosure include at least some of the following content.

The method for wireless communication according to the embodiments of the present disclosure is applicable to a terminal device. As shown in FIG. 2, the method includes the following process.

In S201, a terminal device monitors a first PEI transmitted by a network device. The first PEI includes first wake-up indication information. The first wake-up indication information includes first indication information. The first indication information is a wake-up indication for a first PO corresponding to the first wake-up indication information. The first PO is a PO associated with the first PEI.

The network device transmits the first PEI prior to paging on the PO. The terminal device monitors the first PEI during the PEI monitoring occasion.

The first PEI associates with one or more POs, and the first PEI includes one or more wake-up indication information, wherein for each of the POs associated with the first PEI, the PEI includes corresponding wake-up indication information. Here, the first PO is any one of the one or more POs associated with the first PEI, and the first wake-up indication information is wake-up indication information corresponding to the first PO in the wake-up indication information included in the first PEI.

In one example, the first PEI associates with three POs: a PO 1, a PO 2, and a PO 3, and the first PEI includes: wake-up indication information 1, wake-up indication information 2, and wake-up indication information 3, wherein the wake-up indication information 1 corresponds to the PO 1, the wake-up indication information 2 corresponds to the PO 2, and the wake-up indication information 3 corresponds to the PO 3.

With respect to the first wake-up indication information, the first wake-up indication information includes first indication information, wherein the first indication information is a wake-up indication for the first PO and the first indication information indicates whether the UE that is not subject to group paging on the first PO monitors paging on the first PO.

In the embodiments of the present disclosure, the first indication information indicates wake-up or non-wake-up. The first indication information indicates wake-up, which is understood as that the first indication information indicates that the UE that is not subject to group paging on the first PO monitors paging on the first PO. The first indication information indicates non-wake-up, which is understood as that the first indication information indicates that the UE that is not subject to group paging on the first PO does not monitor paging on the first PO.

In the embodiments of the present disclosure, the first indication information indicates wake-up or non-wake-up based on different values. The indication manner that the first indication information indicates wake-up or non-wake-up is not limited in the present disclosure.

In the embodiments of the present disclosure, in the case that the first PEI associates with a plurality of POs, the settings of the first indication information in the wake-up indications corresponding to different POs are different.

Prior to monitoring the PEI, the terminal device receives PEI configuration related information broadcasted by the network device, such that the terminal device determines a PEI monitoring occasion based on the PEI configuration related information.

The method for wireless communication according to the embodiments of the present disclosure is applicable to a network device. As shown in FIG. 3, the method includes the following process.

In S301, a network device transmits a first PEI. The first PEI includes first wake-up indication information. The first wake-up indication information includes first indication information. The first indication information is a wake-up indication for a first PO corresponding to the first wake-up indication information. The first PO is a PO associated with the first PEI.

The network device transmits the first PEI prior to paging on the PO. The terminal device monitors the first PEI during the PEI monitoring occasion.

The first PEI associates with one or more POs, and the first PEI includes one or more wake-up indication information, wherein for each of the POs associated with the first PEI, the PEI includes corresponding wake-up indication information. Here, the first PO is any one of the one or more POs associated with the first PEI, and the first wake-up indication information is wake-up indication information corresponding to the first PO in the wake-up indication information included in the first PEI.

In one example, the first PEI associates with three POs: a PO 1, a PO 2, and a PO 3, and the first PEI includes: wake-up indication information 1, wake-up indication information 2, and wake-up indication information 3, wherein the wake-up indication information 1 corresponds to the PO 1, the wake-up indication information 2 corresponds to the PO 2, and the wake-up indication information 3 corresponds to the PO 3.

With respect to the first wake-up indication information, the first wake-up indication information includes first indication information, wherein the first indication information is a wake-up indication for the first PO and the first indication information indicates whether the UE that is not subject to group paging on the first PO monitors paging on the first PO.

In the embodiments of the present disclosure, the first indication information indicates wake-up or non-wake-up. The first indication information indicates wake-up, which is understood as that the first indication information indicates that the UE that is not subject to group paging on the first PO monitors paging on the first PO. The first indication information indicates non-wake-up, which is understood as that the first indication information indicates that the UE that is not subject to group paging on the first PO does not monitor paging on the first PO.

In the embodiments of the present disclosure, the first indication information indicates wake-up or non-wake-up based on different values or different bits. The indication manner that the first indication information indicates wake-up or non-wake-up is not limited in the present disclosure.

In the embodiments of the present disclosure, in the case that the first PEI associates with a plurality of POs, the settings of the first indication information in the wake-up indications corresponding to different POs are different.

Prior to transmitting the first PEI, the network device broadcasts PEI configuration related information, such that the terminal device receives the PEI configuration related information broadcasted by the network device before the terminal device monitors the PEI, and the terminal device determines a PEI monitoring occasion based on the PEI configuration related information.

In some embodiments, the first indication information includes either one of:

- meaning 1: the first indication information indicates whether the network device pages a terminal device on the first PO; or
- meaning 2: the first indication information indicates whether the network device pages a terminal device outside N groups on the first PO, wherein N is greater than or equal to 0.

In the case that the first indication information includes the meaning 1, the first indication information indicates whether the network device pages any terminal device on the first PO, wherein the terminal device on the first PO includes: a terminal device that is subject to group paging and a terminal device that is not subject to group paging, wherein the terminal device that is subject to group paging is a terminal device in the N groups (i.e., paging groups) on the first PO, and the terminal device that is not subject to group paging is a terminal device in N groups on a second PO.

The first indication information including the meaning 1 is taken as an example. The terminal devices on the first PO include: UEs 0 to 19, wherein UEs 0 to 15 are organized into three groups, and UEs 16 to 19 are terminal devices that are not subject to group paging. The first indication information indicates whether the network device pages at least one terminal device of UEs 0 to 19 on the first PO.

In the case that the first indication information includes the meaning 1, the network device sets the first indication information based on whether the network device is to page all terminal devices on the first PO, and the terminal device on the first PO directly determines whether the terminal device needs to monitor paging based on the first indication information.

In the case that the first indication information includes the meaning 2, the first indication information indicates whether the network device pages any terminal devices outside the N groups on the first PO, wherein the terminal device on the first PO includes: a terminal device that is subject to group paging and a terminal device that is not subject to group paging, wherein the terminal device that is subject to group paging is a terminal device in the N groups (i.e., paging groups) on the first PO, and the terminal device that is not subject to group paging is a terminal device in N groups on a second PO, and in this case, the first indication information indicates whether the network device pages the terminal device outside the N groups on the first PO.

The first indication information including the meaning 2 is taken as an example. The terminal devices on the first PO include: UEs 0 to 19, wherein UEs 0 to 15 are organized into three groups, and UEs 16 to 19 are terminal devices that are not subject to group paging. The first indication information indicates whether the network device pages at least one terminal device of UEs 16 to 19 on the first PO.

In the case that the first indication information includes the meaning 2, the network device sets the first indication information based on whether the network device is to page the terminal devices outside the groups on the first PO, and the terminal device outside the groups on the first PO determines whether the terminal device needs to monitor paging based on the first indication information.

Here, the number N of groups on the first PO is greater than or equal to 0. The case that N is equal to 0 indicates that no group is present on the first PO, and in this case, all terminal devices on the first PO are not subject to group paging.

In the case that N is 0, no terminal device in the groups is included in the terminal devices on the first PO, and in this case, the terminal devices whether to be paged by the network device in the meaning 1 and the meaning 2 of the first indication information are the same terminal devices.

In some embodiments, indicating wake-up includes one of: the network device is to page at least one terminal device on the first PO; or the network device is to page at least one terminal device outside the N groups on the first PO.

In some embodiments, indicating non-wake-up includes one of: the network device is not to page any terminal device on the first PO; or the network device is not to page any terminal device outside the N groups on the first PO.

In the case that the first indication information indicates wake-up, and the first indication information including the meaning 1 is taken as an example, the network device is to page at least one of all the terminal devices on the first PO, then the network device sets the first indication information to indicate wake-up. In the case that any one of the terminal devices on the first PO receives the first indication information, the terminal device determines to monitor paging on the first PO based on the first indication information.

In one example, the first indication information includes the meaning 1, the terminal devices on the first PO include: UEs 0 to 19, wherein UEs 0 to 15 are organized into three groups, and UEs 16 to 19 are terminal devices that are not subject to group paging, and then the first indication information indicates whether the network device pages at least one terminal device of UEs 0 to 19 on the first PO. In the case that the network device is to page one or more of UEs 0 to 19, the first indication information is set to indicate wake-up. In this case, with respect to UEs 16 to 19, in the case that any of the terminal devices detects the first indication information, the terminal device monitors paging on the first PO based on the first indication information.

In the case that the first indication information indicates wake-up, and the first indication information including the meaning 2 is taken as an example, the network device is to page at least one of the terminal devices outside the N groups on the first PO, then the terminal device sets the first indication information to indicate wake-up. In the case that any of the terminal devices outside the N groups on the first PO receives the first indication information, the terminal device determines to monitor paging on the first PO based on the first indication information.

In one example, the first indication information includes the meaning 2, and the terminal devices on the first PO include: UEs 0 to 19, wherein UEs 0 to 15 are organized into three groups, and UEs 16 to 19 are terminal devices that are not subject to group paging, and then the first indication information indicates whether the network device pages at least one terminal device of UEs 16 to 19 on the first PO. In the case that the network device is to page UE 16, the first indication information is set to indicate wake-up. In this case, with respect to UEs 16 to 19, in the case that any of the terminal devices detects the first indication information, the terminal device monitors paging on the first PO based on the first indication information.

In the case that the first indication information indicates non-wake-up, and the first indication information including meaning 1 is taken as an example, the network device is not to page any terminal device on the first PO, then the network device sets the first indication information to indicate non-wake-up. In the case that any of the terminal devices on the first PO receives the first indication information, the terminal device determines not to monitor paging on the first PO based on the first indication information.

In the case that the first indication information indicates non-wake-up, and the first indication information including the meaning 2 is taken as an example, the network device is not to page any terminal device outside the N groups on the first PO, then the network device sets the first indication information to indicate non-wake-up. In the case that any of the terminal devices outside the N groups on the first PO receives the first indication information, the terminal device determines not to monitor paging on the first PO based on the first indication information.

In some embodiments, in the case that the terminal device monitors the first PEI successfully, the terminal device determines, based on the first indication information, whether to monitor paging on the first PO.

In the embodiments of the present disclosure, the terminal device monitors the first PEI on a monitoring occasion of the first PEI. A monitoring result includes:

monitoring result 1: the first PEI is failed to be monitored; or monitoring result 2: the first PEI is monitored successfully.

Here, in the case that the monitoring result is the monitoring result 1, the network device does not transmit the first PEI, or the network device transmits the PEI but the terminal device fails to detect the first PEI.

In the case that the monitoring result is the monitoring result 1, the terminal device does not monitor paging on the first PO.

In the case that the monitoring result is the monitoring result 2, the terminal device is a terminal device on the PO associated with the first PEI, the terminal device has the PEI capability, and the network device transmits the first PEI on the monitoring occasion.

In the case that the monitoring result is the monitoring result 2 and the terminal device is not subject to group paging, the terminal device determines whether to monitor paging on the first PO based on the first indication information.

In some embodiments, the terminal device determines whether to monitor paging on the first PO based on the first indication information in the case that at least one of the following conditions is satisfied:

Condition 1: The terminal device has a PEI capability but no group paging capability; or Condition 2: The terminal device has a PEI capability but no available group identifier in the current cell.

With respect to the condition 1, the terminal device has the PEI capability, such that the terminal device can monitor the first PEI, but the terminal device does not have the group paging capability, and thus the terminal device does not support group paging, and therefore the terminal device is not subject to group paging.

Here, the terminal device does not have the group paging capability, which means that the terminal device does not support the group mode in which the core network assigns the group identifier (group ID), but also does not support the group mode based on the terminal identifier.

With respect to the condition 2, the terminal device has the PEI capability, such that the terminal device can monitor the first PEI, but the terminal device does not have an available group ID in the current cell, and thus the terminal device is not subject to group paging. The current cell is a cell where the terminal device currently resides.

In some embodiments, the case that the terminal device does not have the available group ID in the current cell in the condition 2 includes, but not limited to, one or more of:

scenario 1: the terminal device only supports the group mode in which the core network assigns the group identifier, but the core network does not assign a group identifier to the terminal device;

scenario 2: the terminal device only supports the group mode in which the core network assigns the group identifier, and the core network assigns a group identifier to the terminal device, but the current cell does not support the group mode in which the core network assigns the group identifier;

scenario 3: the terminal device only supports the group mode based on the terminal identifier, but the current cell does not support the group mode based on the terminal identifier; or scenario 4: the current cell does not support group-based paging.

In the case that the monitoring result is the monitoring result 2 and the first indication information indicates wake-up, the terminal device monitors paging on the first PO; or in the case that the first indication information indicates non-wake-up, the terminal device does not monitor paging on the first PO.

In the case that the first indication information indicates wake-up, the terminal device that monitors the first PEI successfully determines, based on the first indication information, that the network device needs to wake up a terminal device that is not subject to group paging, and then monitors paging on the first PO.

In the case that the first indication information indicates non-wake-up, the terminal device that monitors the first PEI successfully determines, based on the first indication information, that the network device is not to wake up a terminal device that is not subject to group paging, and then does not monitor paging on the first PO.

In some embodiments, the first indication information includes M bits, M being greater than or equal to 1.

In one example, M is 2.

In one example, M is 1.

Taking M being 2 as an example, the first indication information includes: bit 1 and bit 2, wherein the bit 1 is a bit corresponding to wake-up, and the bit 2 is a bit corresponding to non-wake-up. In the case that the a value of the bit 1 is 1, the first indication information indicates wake-up, and in the case that a value of the bit 2 is 1, the first indication information indicates non-wake-up.

Taking M being 2 as an example, the first indication information includes: bit 1 and bit 2, wherein in the case that values of the bit 1 and the bit 2 are 11, the first indication information indicates wake-up, and in the case that the values of the bit 1 and the bit 2 are 00, the first indication information indicates non-wake-up.

Taking M being 1 as an example, the first indication information is 1 bit. In the case that a value of the first indication information is 1, the first indication information indicates wake-up, and in the case that the value of the first indication information is 0, the first indication information indicates non-wake-up.

In some embodiments, values of M corresponding to different POs are the same, and the indication modes for indicating wake-up or non-wake-up are the same.

In some embodiments, the first wake-up indication information further includes second indication information, wherein the second indication information is a wake-up indication for the N groups of the first PO.

Here, the network device sets the second indication information based on whether to wake up terminal devices in the N groups on the first PO. In the case that the terminal devices in the N groups on the first PO monitor the first PEI successfully, the terminal devices determine whether to monitor paging on the first PO based on the second indication information.

In one example, the terminal devices on the first PO include: UEs 0 to 19, wherein UEs 0 to 159 are organized into three groups, and UEs 16 to 19 are terminal devices that are not subject to group paging, then UEs 16 to 19 determine whether to monitor paging on the first PO based on the first indication information, and UEs 0 to 15 determine whether to monitor paging on the first PO based on the second indication information.

In some embodiments, the first wake-up indication information includes M+N bits, the first indication information includes M bits, and the second indication information includes N bits, M being greater than or equal to 1.

In the embodiments of the present disclosure, for each PO associated with the first PEI, M+N bits are set to indicate whether a terminal device on the PO monitors paging on the PO.

In the case that M+N bits indicate whether the terminal devices on the first PO monitors paging, the M bits indicate whether a terminal device outside the N groups monitors paging, and the N bits indicate whether a terminal device in the N groups monitors paging. Each of the N bits corresponds to each of the groups, and with respect to the terminal devices in the N groups, the terminal devices determine whether to monitor paging based on the bits corresponding to their own group IDs.

With respect to M+N bits, a distribution mode includes one of: distribution mode 1: the M bits in the first indication information are first M bits of the first wake-up indication information, and the N bits in the second indication information are last N bits of the first wake-up indication information; or distribution mode 2: the M bits in the first indication information are last M bits of the first wake-up indication information, and the N bits in the second indication information are first N bits of the first wake-up indication information.

In the distribution mode 1, with respect to the M+N bits, the first M bits belong to the first indication information, and the N bits other than the first M bits belong to the second indication information.

In the distribution mode 2, with respect to the M+N bits, the first N bits belong to the second indication information, and the M bits other than the first N bits belong to the first indication information.

Figure 5:
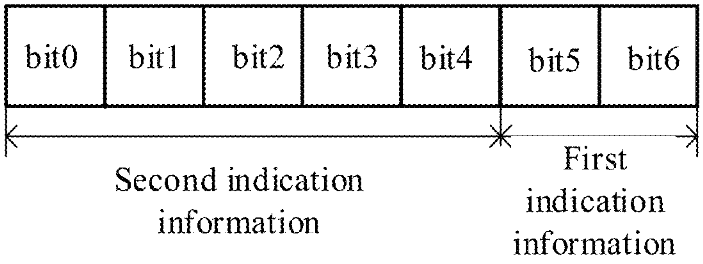
FIG. 5 is a schematic diagram of an alternative format of first wake-up indication information according to some embodiments of the present disclosure.

Taking M being 2 and N being 5 as an example, 7 bits include: bit 0, and bit 1 to bit 6. The distribution mode 1 is as shown in FIG. 4, wherein bit 0 and bit 1 belong to the first indication information, and bit 2 to bit 6 belong to the second indication information. The distribution mode 2 is as shown in FIG. 5, wherein bit 0 to bit 4 belong to the second indication information, and bit 5 and bit 6 belong to the first indication information.

Figure 6:
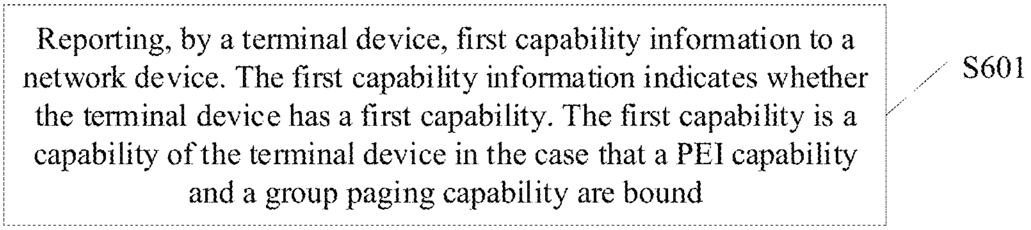
FIG. 6 is an alternative flowchart of a method for wireless communication according to some embodiments of the present disclosure.

The method for wireless communication according to the embodiments of the present disclosure is applicable to a terminal device. As shown in FIG. 6, the method includes the following process.

In S601, a terminal device reports first capability information to a network device. The first capability information indicates whether the terminal device has a first capability. The first capability is a capability of the terminal device in the case that a PEI capability and a group paging capability are bound.

In the embodiments of the present disclosure, the PEI capability and the group paging capability of the terminal device are bound into the capability of the terminal device, i.e., the first capability, and in this case, the terminal device directly reports the first capability to the terminal device instead of independently reporting the PEI capability or the group paging capability to the network device, and the network device knows, based on the first capability, whether the PEI capability and the group paging capability are supported by the terminal device.

In practice, the first capability information is first information indicating the PEI capability, or second information indicating the group paging capability, or third information other than the first information and the second information.

In the case that the first capability information is the first information, the terminal device determines that the terminal device has both the PEI capability and the group paging capability, and then transmits the first information, wherein the first information indicates that the terminal device supports PEI. In this case, the network device receives the first information that is reported by the network and indicates that the terminal device supports the PEI, and then the network device determines that the terminal device supports both PEI and group paging, that is, the terminal device has both the PEI capability and the group paging capability. In the case that the network device receives the first information that indicates that the terminal device does not support PEI, the network device determines that the terminal device does not support group paging either, but in this case, the terminal device can support group paging or cannot support group paging.

In the case that the first capability information is the second information, the terminal device determines that the terminal device has both the PEI capability and the group paging capability, and then transmits the second information, wherein the second information indicates that the terminal device supports group paging. In this case, the network device receives the second information that is reported by the network and indicates that the terminal device supports group paging, and then the network device determines that the terminal device supports both PEI and group paging, that is, the terminal device has both the PEI capability and the group paging capability. In the case that the network device receives the second information that indicates that the terminal device does not support group paging, the network device determines that the terminal device does not support PEI either. However, in this case, the terminal device may support PEI or may not support PEI.

In the case that the first capability information is the third information, the terminal device determines that the terminal device has both the PEI capability and the group paging capability, and then transmits the third information, wherein the third information indicates that the terminal device supports group paging. In this case, the network device receives the third information that is reported by the network and indicates that the terminal device supports group paging, and then the network device determines that the terminal device supports both PEI and group paging, that is, the terminal device has both the PEI capability and the group paging capability. In the case that the network device receives the third information that indicates that the terminal device does not support group paging or PEI, the network device determines that the terminal device does not support PEI or group paging. However, in this case, the terminal device may only support PEI, or only support group paging, or neither.

Upon receiving the first capability information, the network device determines, based on the first capability information, whether the terminal device supports PEI or group paging, and pages based on whether the terminal device supports PEI or group paging.

Figure 7:
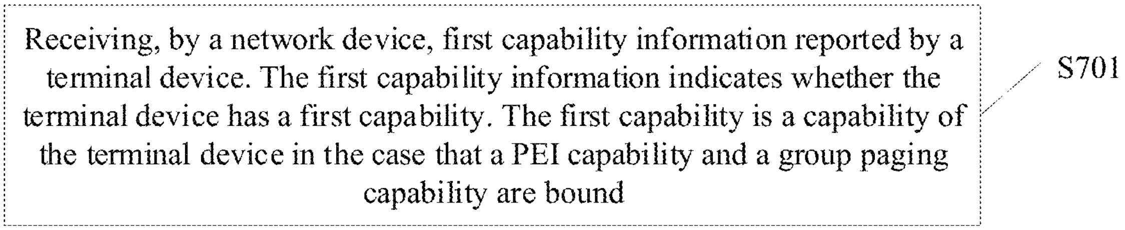
FIG. 7 is an alternative flowchart of a method for wireless communication according to some embodiments of the present disclosure.

The method for wireless communication according to the embodiments of the present disclosure is applicable to a network device. As shown in FIG. 7, the method includes the following process.

In S701, a network device receives first capability information reported by a terminal device. The first capability information indicates whether the terminal device has a first capability. The first capability is a capability of the terminal device in the case that a PEI capability and a group paging capability are bound.

In the embodiments of the present disclosure, the PEI capability and the group paging capability of the terminal device are bound into the capability of the terminal device, i.e., the first capability, and in this case, the terminal device directly reports the first capability to the terminal device instead of independently reporting the PEI capability or the group paging capability to the network device, and the network device knows, based on the first capability, whether the PEI capability and the group paging capability are supported by the terminal device.

In practice, the first capability information is first information indicating the PEI capability, or second information indicating the group paging capability, or third information other than the first information and the second information.

In the case that the first capability information is the first information, the terminal device determines that the terminal device has both the PEI capability and the group paging capability, and then transmits the first information, wherein the first information indicates that the terminal device supports the PEI. In this case, the network device receives the first information that is reported by the network and indicates that the terminal device supports the PEI, and then the network device determines that the terminal device supports both PEI and group paging, that is, the terminal device has both the PEI capability and the group paging capability. In the case that the network device receives the first information that indicates that the terminal device does not support PEI, the network device determines that the terminal device does not support group paging either. However, in this case, the terminal device may support group paging or may not support group paging.

In the case that the first capability information is the second information, the terminal device determines that the terminal device has both the PEI capability and the group paging capability, and then transmits the second information, wherein the second information indicates that the terminal device supports group paging. In this case, the network device receives the second information that is reported by the network and indicates that the terminal device supports group paging, and then the network device determines that the terminal device supports both PEI and group paging, that is, the terminal device has both the PEI capability and the group paging capability. In the case that the network device receives the second information that indicates that the terminal device does not support group paging, the network device determines that the terminal device does not support PEI either. However, in this case, the terminal device may support PEI or may not support PEI.

In the case that the first capability information is the third information, the terminal device determines that the terminal device has both the PEI capability and the group paging capability, and then transmits the third information, wherein the third information indicates that the terminal device supports group paging. In this case, the network device receives the third information that is reported by the network and indicates that the terminal device supports group paging, and then the network device determines that the terminal device supports both PEI and group paging, that is, the terminal device has both the PEI capability and the group paging capability. In the case that the network device receives the third information that indicates that the terminal device does not support group paging or PEI, the network device determines that the terminal device does not support PEI or group paging. However, in this case, the terminal device may only support PEI, or only support group paging, or neither.

Upon receiving the first capability information, the network device determines, based on the first capability information, whether the terminal device supports the PEI and group paging, and pages based on whether the terminal device supports the PEI and group paging.

In some embodiments, in the case that the first indication information indicates that the terminal device has the first capability, the terminal device has both the PEI capability and the group paging capability; or in the case that the first indication information indicates that the terminal device does not have the first capability, the terminal device does not have the PEI capability and/or the group paging capability.

In the case that the first capability information indicates that the terminal device has the first capability, and the terminal device has both the PEI capability and the group paging capability, the terminal device determines that the terminal device has the first capability, and transmits the first capability information to the network device, wherein the first capability indicates that the terminal device has the first capability. The network device determines, based on the first capability information that indicates that the terminal device has the first capability, that the terminal device has both the PEI capability and the group paging capability.

In the case that the first capability information indicates that the terminal device does not have the first capability, and the terminal device does not have the PEI capability or the group paging capability, or does not have the PEI capability or the group paging capability, the terminal device determines that the terminal device does not have the first capability, and transmits the first capability information to the network device, wherein the first capability information indicates that the terminal device does not have the first capability. The network device determines, based on the first capability information that indicates that the terminal device does not have the first capability, that the terminal device does not have the PEI capability or the group paging capability.

In some embodiments, in the case that the terminal device has the first capability but no available group identifier in the current cell, the terminal device does not monitor a second PEI.

In the embodiments of the present disclosure, the network device transmits the second PEI to the terminal device, and the terminal device does not monitor the second PEI in the case that the terminal device has the first capability but no available group identifier in the current cell.

Here, in the case that the network device transmits the second PEI, the terminal that has the first capability and an available group identifier (i.e., is subject to group paging) monitors the second PEI.

In some embodiments, the second PEI includes second wake-up indication information. The second wake-up indication information includes third indication information. The third indication information is a wake-up indication for N groups on a second PO corresponding to the second wake-up indication information. The second PO is a PO associated with the second PEI.

For a terminal device that is subject to group paging, the terminal device can determine whether to monitor paging on a PO based on the second PEI.

For a terminal device that supports group paging but is not subject to group paging, the terminal device cannot determine whether to monitor paging on a PO based on the second PEI, and in this case, the terminal device does not monitor the second PEI, thereby reducing power consumption of the terminal device.

In the embodiments of the present disclosure, prior to transmitting the first PEI, the network device broadcasts PEI configuration related information, such that the terminal device receives the PEI configuration related information broadcasted by the network device before the terminal device monitors the PEI, and the terminal device determines a PEI monitoring occasion based on the PEI configuration related information, and monitors the second PEI based on the PEI monitoring occasion.

In some embodiments, in the case that the terminal device has the first capability but no available group identifier in the current cell, the terminal device monitors paging on each of POs of the terminal device.

In some embodiments, the case that the terminal device does not have the available group identifier in the current cell, includes, but not limited to, one or more of:

scenario 1: the terminal device only supports the group mode in which the core network assigns the group identifier, but the core network does not assign the group identifier to the terminal device;

scenario 2: the terminal device only supports the group mode in which the core network assigns the group identifier, and the core network assigns the group identifier to the terminal device, but the current cell does not support the group mode in which the core network assigns the group identifier;

scenario 3: the terminal device only supports the group mode based on the terminal identifier, but the current cell does not support the group mode based on the terminal identifier; or scenario 4: the current cell does not support group-based paging.

The method for wireless communication according to the embodiments of the present disclosure is further described hereinafter.

Embodiment 1

For each PO associated with a PEI, a 1-bit wake-up indication field for the PO is introduced into the PEI, and a UE that only supports the PEI but does not support group paging and a UE that does not have an available paging group in a current cell determine whether to monitor paging on a corresponding PO based on the indication of the 1-bit wake-up indication field for the PO in the PEI.

Figure 8:
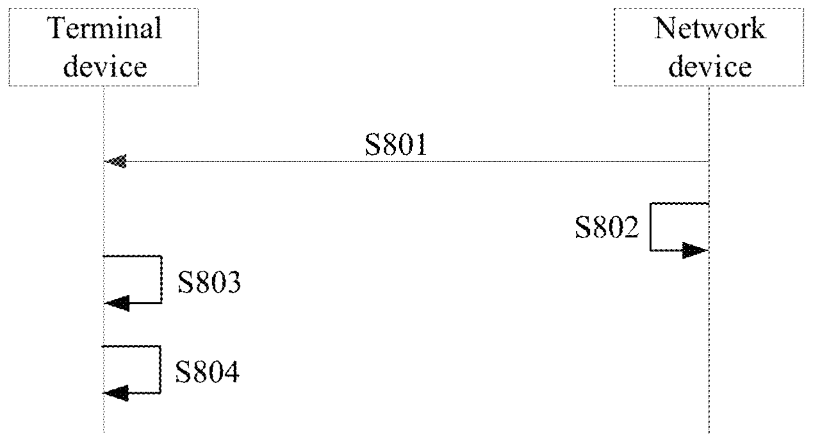
FIG. 8 is an alternative flowchart of a method for wireless communication according to some embodiments of the present disclosure.

As shown in FIG. 8, the method includes the following processes.

In S801, the UE receives PEI configuration related information broadcasted by the network device.

In S802, the network device transmits a PEI based on the PEI configuration related information.

For each PO associated with the PEI, N+1 bits are defined in the PEI for a wake-up indication for the PO, wherein N is the number of groups supported by the current cell, and N is greater than or equal to 0 (N=0 indicates that the current cell does not support paging based on the UE group).

N bits in the N+1 bits are respectively configured for wake-up indications of each of N groups, and 1 bit is configured for the wake-up indication for the PO.

Figure 9:
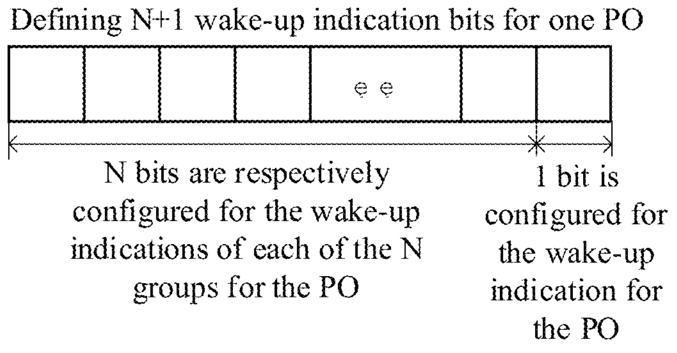
FIG. 9 is a schematic diagram of an alternative format of first wake-up indication information according to some embodiments of the present disclosure.
Figure 10:
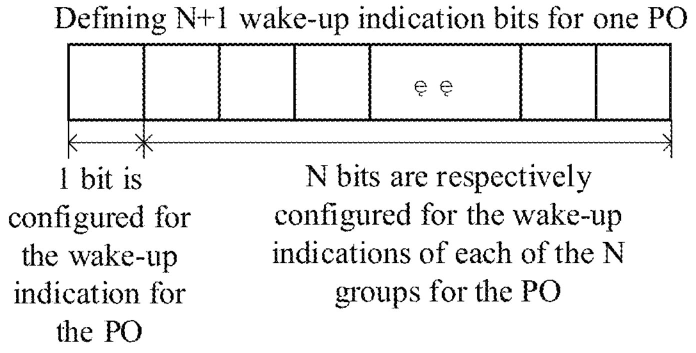
FIG. 10 is a schematic diagram of an alternative format of first wake-up indication information according to some embodiments of the present disclosure.

In some embodiments, in N+1 bits, i.e., wake-up indication bits, defined for one PO:

as shown in FIG. 9, the first N bits (N bits) are respectively configured for the wake-up indications of each of the N groups for the PO, and the $(N+1)^{th}$ bit (1 bit) is configured for the wake-up indication for the PO; or as shown in FIG. 10, the first bit (1 bit) is configured for the wake-up indication for the PO, and the second to $(N+1)^{th}$ bits (N bits) are respectively configured for the wake-up indications of each of the N groups for the PO.

In some embodiments, the meaning and indication manner of the 1-bit wake-up indication for the PO are as follows.

Method 1: in the case that the network device is to page at least one UE on the PO, the 1-bit wake-up indication field is set as "wake-up"; and in the case that the network device is not to wake up any UE on the PO, the 1-bit wake-up indication field is set as "non-wake-up".

Method 2: in the case that the network device is to page at least one UE outside the N groups on the PO, the 1-bit wake-up indication field is set as "wake-up"; and in the case that the network device is not to wake any UE outside the N groups on the PO, the 1-bit wake-up indication field is set as "non-wake-up".

In S803, the UE monitors, based on the PEI configuration related information, the PEI during a PEI monitoring occasion.

Here, for a UE with a PEI capability, that is, for a UE supports the PEI, the UE monitors, based on the PEI configuration related information, the PEI during the PEI monitoring occasion.

In S804, the UE determines whether to monitor paging on the PO based on a PEI detection result and the wake-up indication for the PO in the PEI.

The UE determines whether to monitor paging on the PO based on the PEI detection result and the wake-up indication for the PO in the PEI in the following cases.

Case 1: The UE has only a PEI capability but no group paging capability.

Case 2: The UE has no available group ID in the current cell.

The case that the UE determines whether to monitor paging on the PO based on the PEI detection result and the wake-up indication for the PO in the PEI includes:

a) in the case that the UE detects the PEI successfully and the wake-up indication field for the PO in the PEI indicates "wake-up", the UE monitors paging on the PO; and b) in the case that the UE fails to detect the PEI, or in the case that the UE detects the PEI successfully and the wake-up indication field for the PO in the PEI indicates "non-wake-up", the UE does not monitor paging on the PO.

Embodiment 2

Figure 11:
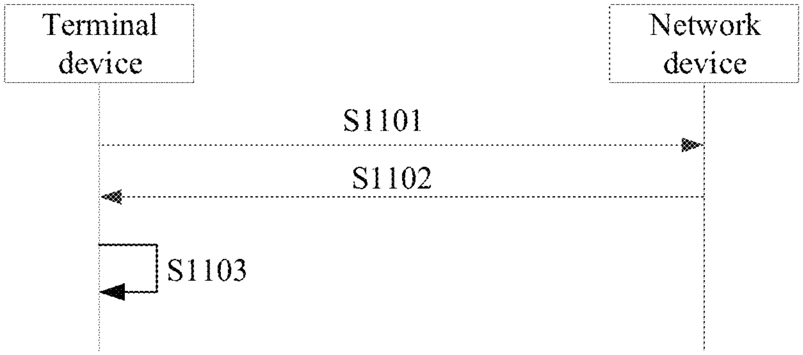
FIG. 11 is an alternative flowchart of a method for wireless communication according to some embodiments of the present disclosure.

The PEI capability and the group paging capability are bound into one UE capability. For each PO associated with the PEI, only a wake-up indication for group paging is defined in the PEI, and then a UE having no available paging group in the current cell does not monitor the PEI but normally monitors paging on each PO. As shown in FIG. 11, the method includes the following processes.

In S1101, the UE reports the paging capability.

In the process, the PEI capability and the group paging capability are bound into one UE capability. That is, the UE supporting PEI supports group paging, and the UE supporting group paging also supports PEI.

In S1102, the UE receives PEI configuration related information broadcasted by the network device.

In S1103, the UE monitors paging on each PO of the UE.

For a UE supporting PEI, in the case that the UE has no available group ID in the current cell, the UE does not monitor PEI. The UE normally monitors paging on each PO of the UE. The case that the UE has no available group ID in the current cell includes, but is not limited to, the following cases.

The UE only supports the group mode in which the CN assigns the group ID, but the CN does not assign the group ID to the UE.

The UE only supports the group mode in which the CN assigns the group ID, the CN assigns the group ID to the UE, but the current cell does not support the group mode in which the CN assigns the group ID.

The UE only supports the group mode based on the UE ID, but the current cell does not support the group mode based on the UE ID.

The current cell does not support group-based paging.

The paging method based on PEI according to the embodiments of the present disclosure is as follows.

1. For each PO associated with the PEI, the 1-bit wake-up indication field for the PO is introduced into the PEI, and the UE that only supports the PEI but does not support group paging and the UE that does not have an available paging group in the current cell determine whether to monitor paging on the corresponding PO based on the indication of the 1-bit wake-up indication field for the PO in the PEI.

2. The PEI capability and the group paging capability are bound into one UE capability. For each PO associated with the PEI, only the wake-up indication for group paging is defined in the PEI, and then the UE having no available paging group in the current cell does not monitor the PEI but normally monitors paging on each PO.

The paging method based on PEI according to the embodiments of the present disclosure can solve the problem of how the UE monitors the PEI and/or paging on a certain cell in the case that the UEs have no available group ID in the cell.

The exemplary embodiments of the present disclosure have been described in detail with reference to the accompanying drawings. However, the present disclosure is not limited to the specific details of the above embodiments, and various simple modifications may be made to the technical solutions of the present disclosure within the technical idea of the present disclosure, and these simple modifications all fall within the protection scope of the present disclosure. For example, the various specific technical features described in the above specific embodiments may be combined in any suitable manner without contradiction, and various possible combinations are not illustrated in the present disclosure, thereby avoiding unnecessary repetition. For another example, various embodiments of the present disclosure may be combined arbitrarily, and combined embodiments should be considered as the contents disclosed in the present disclosure as long as they do not violate the concept of the present disclosure. For another example, on the premise of no conflict, the embodiments described in the present disclosure and/or the technical features of the embodiments may be arbitrarily combined with the related art, and the combined technical solutions also fall within the protection scope of the present disclosure.

It is also understandable that in the various method embodiments of the present disclosure, the numerical order of the above-mentioned processes does not imply the sequence of execution. The execution order of these processes is determined by their functions and internal logic, and do not impose any limitation on the implementation of the embodiments of the present disclosure. Furthermore, in the embodiments of the present disclosure, the terms "downlink," "uplink" and "sidelink" indicates indicate the transmission direction of signals or data, wherein "downlink" indicates that the transmission direction of signals or data is a first direction transmitted from a station to a user equipment of a cell, "uplink" indicates that the transmission direction of signals or data is a second direction transmitted from a user equipment of a cell to a station, and "sidelink" indicates that the transmission direction of signals or data is a third direction transmitted from a user equipment 1 to a user equipment 2. For example, "downlink signal" indicates that the transmission direction of the signal is the first direction. In addition, in the embodiments of the present disclosure, the term "and/or" is only an association relationship that describes the association objects, and indicates that three relationships may be present. For example, the phrase "A and/or B" means that A is present only, both A and B are present, and B is present only. In addition, the character "/" herein generally indicates an "or" relationship between the associated objects.

Figure 12:
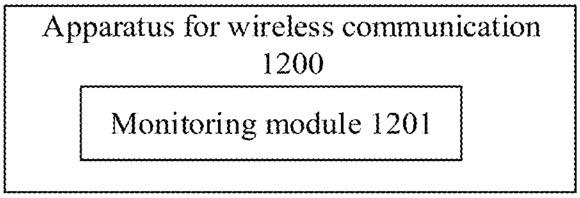
FIG. 12 is an alternative schematic block diagram of an apparatus for wireless communication according to some embodiments of the present disclosure.

FIG. 12 is a schematic structural diagram of an apparatus for wireless communication according to some embodiments of the present disclosure, which is applicable to a terminal device. As shown in FIG. 12, the apparatus 1200 for wireless communication includes a monitoring module 1201.

The monitoring module 1201 is configured to monitor a first PEI transmitted by a network device, wherein the first PEI includes first wake-up indication information, the first wake-up indication information including first indication information, the first indication information being a wake-up indication for a first PO corresponding to the first wake-up indication information, the first PO being a PO associated with the first PEI.

In some embodiments, the first indication information indicates: whether the network device pages a terminal device on the first PO; or whether the network device pages a terminal device outside N groups on the first PO, the N being greater than or equal to 0.

In some embodiments, indicating wake-up includes one of: the network device is to page at least one terminal device on the first PO; or the network device is to page at least one terminal device outside the N groups on the first PO.

In some embodiments, indicating non-wake-up includes one of: the network device is not to page any terminal device on the first PO; or the network device is not to page any terminal device outside the N groups on the first PO.

In some embodiments, the apparatus 1200 further includes a determining module.

The determining module is configured to determine, in the case that the terminal device monitors the first PEI successfully, whether to monitor paging on the first PO based on the first indication information.

In some embodiments, the terminal device determines whether to monitor paging on the first PO based on the first indication information in the case that at least one of the following conditions is satisfied: the terminal device has a PEI capability but no group paging capability; or the terminal device has a PEI capability but no available group identifier in a current cell.

In some embodiments, the case that the terminal device has no available group identifier in the current cell includes at least one of: the terminal device only supports a group mode in which a core network assigns a group identifier, but the core network does not assign a group identifier to the terminal device; the terminal device only supports a group mode in which a core network assigns a group identifier, and the core network assigns a group identifier to the terminal device, but the current cell does not support the group mode in which the core network assigns the group identifier; the terminal device only supports a group mode based on a terminal identifier, but the current cell does not support the group mode based on the terminal identifier; or the current cell does not support group-based paging.

In some embodiments, in the case that the first indication information indicates wake-up, the terminal device monitors paging on the first PO; or in the case that the first indication information indicates non-wake-up, the terminal device does not monitor paging on the first PO.

In some embodiments, the first indication information includes M bits, M being greater than or equal to 1.

In some embodiments, the first wake-up indication information further includes second indication information, wherein the second indication information is a wake-up indication for the N groups of the first PO.

In some embodiments, the first wake-up indication information includes M+N bits, the first indication information includes M bits, and the second indication information includes N bits.

In some embodiments, the M bits in the first indication information are first M bits of the first wake-up indication information, and the N bits in the second indication information are last N bits of the first wake-up indication information.

In some embodiments, the M bits in the first indication information are last M bits of the first wake-up indication information, and the N bits in the second indication information are first N bits of the first wake-up indication information.

Figure 13:
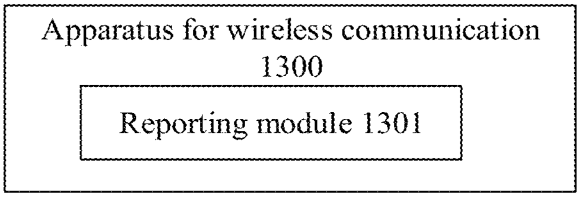
FIG. 13 is an alternative schematic block diagram of an apparatus for wireless communication according to some embodiments of the present disclosure.

FIG. 13 is a schematic structural diagram of an apparatus for wireless communication according to some embodiments of the present disclosure, which is applicable to a terminal device, and as shown in FIG. 13, the apparatus 1300 for wireless communication includes a reporting module 1301.

The reporting module 1301 is configured to report first capability information to a network device. The first capability information indicates whether the terminal device has a first capability. The first capability is a capability of the terminal device in the case that a PEI capability and a group paging capability are bound.

In some embodiments, in the case that the first indication information indicates that the terminal device has the first capability, the terminal device has both the PEI capability and the group paging capability; or in the case that the first indication information indicates that the terminal device does not have the first capability, the terminal device does not have the PEI capability and/or the group paging capability.

In some embodiments, in the case that the terminal device has the first capability but no available group identifier in the current cell, the terminal device does not monitor a second PEI transmitted by the network device.

In some embodiments, the second PEI includes second wake-up indication information. The second wake-up indication information includes third indication information. The third indication information is a wake-up indication for N groups on a second PO corresponding to the second wake-up indication information. The second PO is a PO associated with the second PEI.

In some embodiments, the apparatus 1300 further includes: a paging module, configured to monitor paging on each of the POs of the terminal in the case that the terminal device has the first capability but no available group identifier in the current cell.

In some embodiments, the case that the terminal device has no available group identifier in the current cell includes one of:

- the terminal device only supports a group mode in which a core network assigns a group identifier, but the core network does not assign a group identifier to the terminal device;
- the terminal device only supports a group mode in which a core network assigns a group identifier, and the core network assigns a group identifier to the terminal device, but the current cell does not support the group mode in which the core network assigns the group identifier;
- the terminal device only supports a group mode based on a terminal identifier, but the current cell does not support the group mode based on the terminal identifier; or
- the current cell does not support group-based paging.

Figure 14:
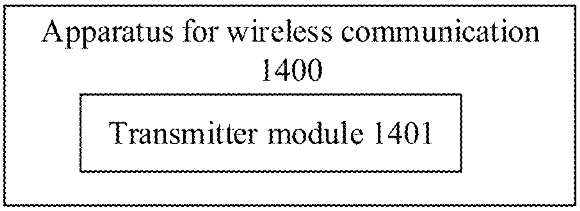
FIG. 14 is an alternative schematic block diagram of an apparatus for wireless communication according to some embodiments of the present disclosure.

FIG. 14 is a schematic structural diagram of an apparatus for wireless communication according to some embodiments of the present disclosure, which is applicable to a network device, and as shown in FIG. 14, the apparatus 1400 for wireless communication includes a transmitter module 1401.

The transmitter module 1401 is configured to transmit a first PEI. The first PEI includes first wake-up indication information. The first wake-up indication information includes first indication information. The first indication information is a wake-up indication for a first PO corresponding to the first wake-up indication information. The first PO is a PO associated with the first PEI.

In some embodiments, the first indication information indicates: whether the network device pages a terminal device on the first PO; or whether the network device pages a terminal device outside N groups on the first PO, the N being greater than or equal to 0.

In some embodiments, indicating wake-up includes one of: the network device is to page at least one terminal device on the first PO; or the network device is to page at least one terminal device outside the N groups on the first PO.

In some embodiments, indicating non-wake-up includes one of: the network device is not to page any terminal device on the first PO; or the network device is not to page any terminal device outside the N groups on the first PO.

In some embodiments, the first indication information is further configured for the terminal device that monitors the first PEI successfully to determine whether to monitor paging on the first PO.

In some embodiments, the terminal device that monitors the first PEI successfully determines whether to monitor paging on the first PO by meeting at least one of: the terminal device has a PEI capability but no group paging capability; or the terminal device has a PEI capability but no available group identifier in a current cell.

In some embodiments, the case that the terminal device has no available group identifier in the current cell includes at least one of: the terminal device only supports a group mode in which a core network assigns a group identifier, but the core network does not assign a group identifier to the terminal device; the terminal device only supports a group mode in which a core network assigns a group identifier, and the core network assigns a group identifier to the terminal device, but the current cell does not support the group mode in which the core network assigns the group identifier; the terminal device only supports a group mode based on a terminal identifier, but the current cell does not support the group mode based on the terminal identifier; or the current cell does not support group-based paging.

In some embodiments, in the case that the first indication information indicates wake-up, the terminal device monitors paging on the first PO; or in the case that the first indication information indicates non-wake-up, the terminal device does not monitor paging on the first PO.

In some embodiments, the first indication information includes M bits, M being greater than or equal to 1.

In some embodiments, the first wake-up indication information further includes second indication information, wherein the second indication information is a wake-up indication for the N groups of the first PO.

In some embodiments, the first wake-up indication information includes M+N bits, the first indication information includes M bits, and the second indication information includes N bits, M being greater than or equal to 1.

In some embodiments, the M bits in the first indication information are first M bits of the first wake-up indication information, and the N bits in the second indication information are last N bits of the first wake-up indication information.

In some embodiments, the M bits in the first indication information are last M bits of the first wake-up indication information, and the N bits in the second indication information are first N bits of the first wake-up indication information.

Figure 15:
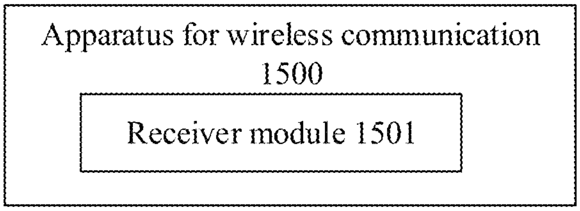
FIG. 15 is an alternative schematic block diagram of an apparatus for wireless communication according to some embodiments of the present disclosure.

FIG. 15 is a schematic structural diagram of an apparatus for wireless communication according to some embodiments of the present disclosure, which is applicable to a network device, and as shown in FIG. 15, the apparatus 1500 for wireless communication includes a receiver module 1501.

The receiver module 1501 is configured to receive first capability information reported by a terminal device, wherein the first capability information indicates whether the terminal device has a first capability, the first capability being a capability of the terminal device in the case that a PEI capability and a paging capability are bound.

In some embodiments, in the case that the first indication information indicates that the terminal device has the first capability, the terminal device has both the PEI capability and the group paging capability; or in the case that the first indication information indicates that the terminal device does not have the first capability, the terminal device does not have the PEI capability and/or the group paging capability.

In some embodiments, the transmitter module 1401 is further configured to transmit a second PEI; and in the case that the terminal device has the first capability but no available group identifier in a current cell, the terminal device does not monitor the second PEI.

In some embodiments, the second PEI includes second wake-up indication information, wherein the second wake-up indication information includes third indication information, the third indication information being a wake-up indication for N groups on a second PO corresponding to the second wake-up indication information, the second PO being a PO associated with the second PEI.

In some embodiments, the case that the terminal device has no available group identifier in the current cell includes one of: the terminal device only supports a group mode in which a core network assigns a group identifier, but the core network does not assign a group identifier to the terminal device; the terminal device only supports a group mode in which a core network assigns a group identifier, and the core network assigns a group identifier to the terminal device, but the current cell does not support the group mode in which the core network assigns the group identifier; the terminal device only supports a group mode based on a terminal identifier, but the current cell does not support the group mode based on the terminal identifier; or the current cell does not support group-based paging.

It is understandable by those skilled in the art that the related description of the apparatus for wireless communication according to the embodiments of the present disclosure can be understood by referring to the related description of the method for wireless communication according to the embodiments of the present disclosure.

Figure 16:
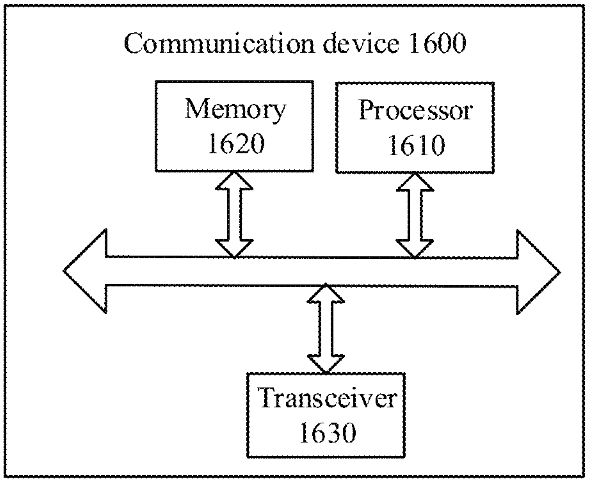
FIG. 16 is a schematic block diagram of a communication device according to some embodiments of the present disclosure.

FIG. 16 is a schematic structural diagram of a communication device 1600 according to some embodiments of the present disclosure. The communication device is a terminal device or a network device. The communication device 1600 shown in FIG. 16 includes a processor 1610. The processor 1610, when loading and running one or more computer programs from a memory, is caused to perform the methods in the embodiments of the present disclosure.

In some embodiments, as shown in FIG. 16, the communication device 1600 further includes a memory 1620. The processor 1610, when loading and running one or more computer programs from the memory 1620, is caused to perform the methods in the embodiments of the present disclosure.

The memory 1620 is a separate device independent from the processor 1610, or the memory 1620 is integrated within the processor 1610.

In some embodiments, as shown in FIG. 16, the communication device 1600 further includes a transceiver 1630. The processor 1610 controls the transceiver 1630 to communicate with other devices. For example, the processor 1610 controls the transceiver 1630 to transmit information or data to other devices, or to receive information or data transmitted by other devices.

The transceiver 1630 includes a transmitter and a receiver. The transceiver 1630 further includes one or more antennas.

In some embodiments, the communication device 1600 is the network device of the embodiments of the present disclosure, and the communication device 1600 performs corresponding flows performed by the network device in various methods of the embodiments of the present disclosure, which is not repeated herein for brevity.

In some embodiments, the communication device 1600 is the mobile terminal/terminal device of the embodiments of the present disclosure, and the communication device 1600 performs corresponding flows performed by the mobile terminal/terminal device in various methods of the embodiments of the present disclosure, which is not repeated herein for brevity.

Figure 17:
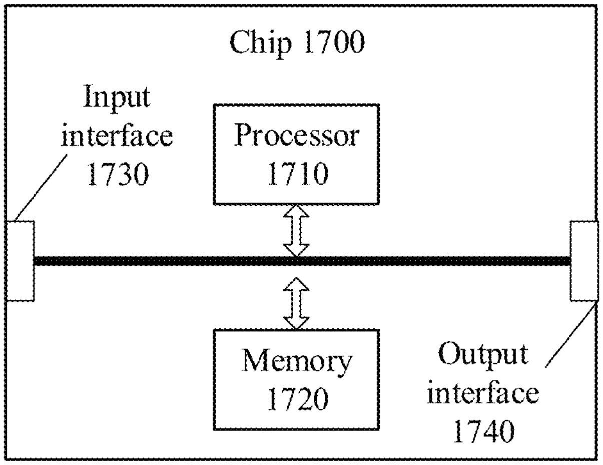
FIG. 17 is a schematic block diagram of a chip according to some embodiments of the present disclosure.

FIG. 17 is a schematic structural diagram of a chip according to some embodiments of the present disclosure. The chip 1700 shown in FIG. 17 includes a processor 1710. The processor 1710, when loading and running one or more computer programs from a memory, is caused to perform the methods in the embodiments of the present disclosure.

In some embodiments, as shown in FIG. 17, the chip 1700 further includes a memory 1720. The processor 1710, when loading and running one or more computer programs from the memory 1720, is caused to perform the methods in the embodiments of the present disclosure.

The memory 1720 is a separate device independent from the processor 1710, or the memory 1720 is integrated within the processor 1710.

In some embodiments, the chip 1700 further includes an input interface 1730. The processor 1710 controls the input interface 1730 to communicate with other devices or chips. For example, the processor 1710 controls the input interface 1730 to acquire information or data transmitted by other devices or chips.

In some embodiments, the chip 1700 further includes an output interface 1740. The processor 1710 controls the output interface 1740 to communicate with other devices or chips. For example, the processor 1710 controls the output interface 1740 to output information or data to other devices or chips.

In some embodiments, the chip is applicable to the network device in the embodiments of the present disclosure, and the chip performs corresponding flows performed by the network device in various methods of the embodiments of the present disclosure, which is not repeated herein for brevity.

In some embodiments, the chip is applicable to the mobile terminal/terminal device in the embodiments of the present disclosure, and the chip performs corresponding flows performed by the mobile terminal/terminal device in various methods of the embodiments of the present disclosure, which is not repeated herein for brevity.

It is understandable that the chip mentioned in the embodiments of the present disclosure may also be referred to as system-on-chip, system chip, chip system, or on-chip system.

Figure 18:
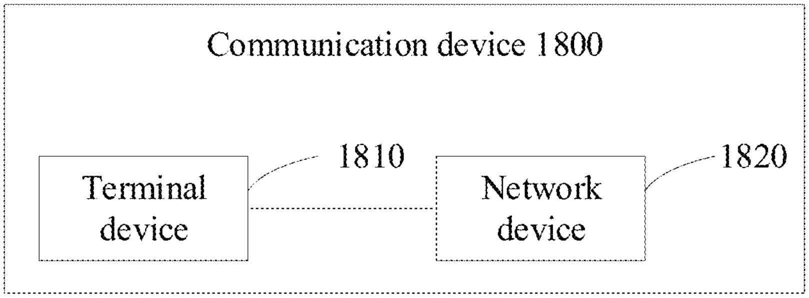
FIG. 18 is a schematic block diagram of a communication system according to some embodiments of the present disclosure.

FIG. 18 is a schematic block diagram of a communication system 1800 according to some embodiments of the present disclosure. As shown in FIG. 18, the communication system 1800 includes a terminal device 1810 and a network device 1820.

The terminal device 1810 is configured to perform corresponding functions performed by the terminal device in the above methods, and the network device 1820 is configured to perform corresponding functions performed by the network device in the above methods, which is not repeated herein for brevity.

It is understandable that the processor of the embodiments of the present disclosure may be an integrated circuit chip with signal processing capabilities. In implementation, the processes of the above method embodiments can be performed by hardware integrated logic circuits or software instructions in the processor. The above processor can be a general-purpose processor, a digital signal processor (DSP), an application specific integrated circuit (ASIC), a field programmable gate array (FPGA), or another programmable logic device, discrete gate or transistor logic device, or discrete hardware assembly. The methods, processes, and logic block diagrams disclosed in the embodiments of the present disclosure can be implemented or performed. The general-purpose processor can be a microprocessor or the processor can be any conventional processor or the like. The processes of the methods disclosed in connection with the embodiments of the present disclosure can be directly embodied as hardware and performed by a coding processor, or performed by a combination of hardware and software modules in the coding processor. The software module can be located in a random access memory, a flash memory, a read-only memory, a programmable read-only memory, an electrically erasable programmable memory, a register, or other mature storage medium in the art. The storage medium is located in a memory, and the processor reads information in the memory to perform the processes of the above methods in combination with the hardware of the memory.

It is understandable that the memory in the embodiments of the present disclosure can be either a volatile memory or a non-volatile memory, or can include both the volatile memory and the non-volatile memory. The non-volatile memory can be a read-only memory (ROM), a programmable ROM (PROM), an erasable PROM (EPROM), an electrically EPROM (EEPROM), or a flash memory. The volatile memory can be a random access memory (RAM) which serves as an external cache. By way of example and not limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memory of the systems and methods described herein is intended to include, but not limited to, these and any other suitable types of memories.

It is understandable that the above-mentioned memories are exemplary but not limiting. For example, the memory in the embodiments of the present disclosure can also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM), or the like. That is, the memory in the embodiments of the present disclosure is intended to include, but not limited to, these and any other suitable types of memories.

Some embodiments of the present disclosure provide a non-transitory computer-readable storage medium. The non-transitory computer-readable storage medium is configured to store one or more computer programs.

In some embodiments, the non-transitory computer-readable storage medium is applicable to the network device in the embodiments of the present disclosure, and the one or more computer programs, when loaded and run on a computer, cause the computer to perform corresponding flows performed by the network device in various methods of the embodiments of the present disclosure, which is not repeated herein for brevity.

In some embodiments, the non-transitory computer-readable storage medium is applicable to the mobile terminal/terminal device in the embodiments of the present disclosure, and the one or more computer programs, when loaded and run on a computer, cause the computer to perform corresponding flows performed by the mobile terminal/terminal device in various methods of the embodiments of the present disclosure, which is not repeated herein for brevity.

Some embodiments of the present disclosure provide a computer program product. The computer program product includes one or more computer program instructions.

In some embodiments, the computer program product is applicable to the network device in the embodiments of the present disclosure, and the one or more computer program instructions, when loaded and executed on a computer, cause the computer to perform corresponding flows performed by the network device in various methods of the embodiments of the present disclosure, which is not repeated herein for brevity.

In some embodiments, the computer program product is applicable to the mobile terminal/terminal device in the embodiments of the present disclosure, and the one or more computer program instructions, when loaded and executed on a computer, cause the computer to perform corresponding flows performed by the mobile terminal/terminal device in various methods of the embodiments of the present disclosure, which is not repeated herein for brevity.

Some embodiments of the present disclosure provide a computer program.

In some embodiments, the one or more computer programs are applicable to the network device in the embodiments of the present disclosure, and the one or more computer programs, when loaded and run on a computer, cause the computer to perform corresponding flows performed by the network device in various methods of the embodiments of the present disclosure, which is not repeated herein for brevity.

In some embodiments, the one or more computer programs are applicable to the mobile terminal/terminal device in the embodiments of the present disclosure, and the one or more computer programs, when loaded and run on a computer, cause the computer to perform corresponding flows performed by the mobile terminal/terminal device in various methods of the embodiments of the present disclosure, which is not repeated herein for brevity.

Those of ordinary skill in the art will appreciate that the units and algorithm processes of various examples described in connection with the embodiments disclosed herein can be performed in electronic hardware, or a combination of computer software and electronic hardware. Whether these functions are performed in hardware or software depends on the particular application and design constraints of the technical solutions. Those skilled in the art may perform the described functions in varying ways for each particular application, but such implementations are not to be interpreted as departing from the scope of the present disclosure.

Those skilled in the art can clearly understand that, for convenience and brevity in description, the specific working processes of the systems, apparatuses, and units described above can refer to the corresponding processes in the aforementioned method embodiments, which are not repeated herein.

In the several embodiments provided in the present disclosure, it is understandable that the disclosed systems, apparatuses, and methods can be performed in other ways. For example, the above-described apparatus embodiments are merely illustrative. For example, the division of the units is only one type of logical functional division, and other divisions can be achieved in practice. For example, a plurality of units or components can be combined or integrated into another system, or some features can be omitted, or not executed. In addition, the shown or discussed mutual coupling or direct coupling or communication connection can be an indirect coupling or communication connection through some interfaces, apparatuses, or units, and can be in an electrical, mechanical, or another form.

The units described as separate parts may or may not be physically separate, and parts displayed as units may or may not be physical units, that is, the units may be located in one location, or may be distributed on a plurality of network units. Some or all of the units can be selected based on actual needs to achieve the purpose of the solutions of the embodiments.

In addition, various functional units in the embodiments of the present disclosure can be integrated into one processing unit, or various units can be physically present separately, or two or more units can be integrated into one unit.

The functions can be stored in a non-transitory computer-readable storage medium if they are performed in software functional units and sold or used as independent products. Based on such understandings, the technical solutions of the present disclosure substantially or a part of the technical solutions that contributes to the related art, or a part of the technical solutions, can be embodied in a software product, which is stored in a storage medium and includes several instructions for causing a computer device (which can be a personal computer, a server, or a network device) to perform all or part of the processes of the methods as defined in the embodiments of the present disclosure. The aforementioned storage medium includes various medium capable of storing program codes, such as a U-disk, a mobile hard disk, a read-only memory (ROM), a random access memory (RAM), a magnetic disk, and an optical disk.

The above descriptions are only specific embodiments of the present disclosure, but the protection scope of the present disclosure is not limited to these. Any technical personnel skilled in the art can easily think of changes or substitutions within the technical scope disclosed herein, and these changes or substitutions should be covered within the protection scope of the present disclosure. Therefore, the protection scope of the present disclosure shall be subject to the protection scope of the claims.

The invention claimed is:

1. A method for wireless communication, performed by a terminal device, comprising:
   reporting first capability information to a network device, wherein the first capability information indicating whether the terminal device has a first capability, the first capability being a capability of the terminal device in a case that a paging early indication (PEI) capability and a group paging capability are bound; and
   monitoring paging on each paging occasion (PO) of the terminal device in a case that the terminal device has the first capability but no available group identifier in a current cell.

2. The method according to claim 1, wherein
   in a case that the terminal device has the first capability but no available group identifier in a current cell, the terminal device does not monitor a second PEI transmitted by the network device; wherein:
   the second PEI comprises second wake-up indication information, the second wake-up indication information comprising third indication information, the third indication information being a wake-up indication for N groups on a second PO corresponding to the second wake-up indication information, and the second PO being a PO associated with the second PEI.

3. The method according to claim 1, wherein
   in a case that the first indication information indicates that the terminal device has the first capability, the terminal device has both the PEI capability and the group paging capability; or
   in a case that the first indication information indicates that the terminal device does not have the first capability, the terminal device does not have the PEI capability and/or the group paging capability.

4. The method according to claim 1, wherein
   in a case that the terminal device has the first capability but no available group identifier in a current cell, the terminal device does not monitor a second PEI transmitted by the network device.

5. The method according to claim 1, further comprising:
   wherein the case that the terminal device has no available group identifier in the current cell comprises one of:
   - the terminal device only supports a group mode in which a core network assigns a group identifier, but the core network does not assign a group identifier to the terminal device;
   - the terminal device only supports a group mode in which a core network assigns a group identifier, and the core network assigns a group identifier to the terminal device, but the current cell does not support the group mode in which the core network assigns the group identifier;
   - the terminal device only supports a group mode based on a terminal identifier, but the current cell does not support the group mode based on the terminal identifier; or
   - the current cell does not support group-based paging.

6. A terminal device, comprising:
   a processor and a memory, wherein the memory is configured to store one or more computer programs, which when executed by the processor, cause the processor to:
   report first capability information to a network device, wherein the first capability information indicating whether the terminal device has a first capability, the first capability being a capability of the terminal device in a case that a paging early indication (PEI) capability and a group paging capability are bound; and monitor paging on each paging occasion (PO) of the terminal device in a case that the terminal device has the first capability but no available group identifier in a current cell.

7. The terminal device according to claim 6, wherein in a case that the terminal device has the first capability but no available group identifier in a current cell, the terminal device does not monitor a second PEI transmitted by the network device;

wherein the second PEI comprises second wake-up indication information, the second wake-up indication information comprising third indication information, the third indication information being a wake-up indication for N groups on a second PO corresponding to the second wake-up indication information, and the second PO being a PO associated with the second PEI.

8. The terminal device according to claim 6, wherein:

in a case that the first indication information indicates that the terminal device has the first capability, the terminal device has both the PEI capability and the group paging capability; or in a case that the first indication information indicates that the terminal device does not have the first capability, the terminal device does not have the PEI capability and/or the group paging capability.

9. The terminal device according to claim 6, wherein in a case that the terminal device has the first capability but no available group identifier in a current cell, the terminal device does not monitor a second PEI transmitted by the network device.

10. The terminal device according to claim 6, wherein the case that the terminal device has no available group identifier in the current cell comprises one of:

the terminal device only supports a group mode in which a core network assigns a group identifier, but the core network does not assign a group identifier to the terminal device;

the terminal device only supports a group mode in which a core network assigns a group identifier, and the core network assigns a group identifier to the terminal device, but the current cell does not support the group mode in which the core network assigns the group identifier;

the terminal device only supports a group mode based on a terminal identifier, but the current cell does not support the group mode based on the terminal identifier; or the current cell does not support group-based paging.

11. A chip, comprising:

a processor, wherein the processor, when loading and running one or more computer programs from a memory, causes a device provided with the chip to perform the method as defined in claim 1.

* * * * *